United States Patent Office 3,784,575
Patented Jan. 8, 1974

---

3,784,575
OXIDATION OF PHENOLS
Thomas F. Rutledge, Wilmington, Del., assignor to ICI America Inc., Wilmington, Del.
No Drawing. Continuation-in-part of abandoned application Ser. No. 879,540, Nov. 24, 1969. This application May 5, 1972, Ser. No. 250,573
Int. Cl. C07c 43/20, 49/64
U.S. Cl. 260—396 R                14 Claims

ABSTRACT OF THE DISCLOSURE

An improved process for the oxidation of mono and dialkyl phenols which comprises the coupling of the phenol in the presence of an oxygen containing gas and a catalyst selected from the group consisting of manganous acetylacetonate, manganous salicyclideneimine, cerium acetylacetonate and other chelates of manganous and cerous ions. The process is solvent specific and has been found to yield the best results in a solvent which is a saturated aliphatic monohydric alcohol containing from 2 to 10 carbon atoms, a saturated aliphatic ketone containing from 4 to 12 carbon atoms, an ester of a saturated aliphatic monohydric alcohol containing from 4 to 10 carbon atoms and acetic, propionic, or butyric acid, ethylene glycol diacetate, diethylene glycol diacetate, triethylene glycol diacetate, and ether-esters characterized by the formula

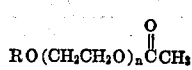

wherein $n$ is 1, 2, or 3 and R is an alkyl group containing from 1 to 4 carbon atoms.

---

This application is a continuation-in-part of U.S. patent application Ser. No. 879,540, filed Nov. 24, 1969, now abandoned.

This invention concerns an improved process for the oxidation of monoalkyl phenols and dialkyl phenols to diphenoquinones and polypehnoxy ethers. More particularly, this invention relates to the oxidation of 2,6-dialkyl substituted phenols and ortho or para-substituted alkyl phenols to diphenoquinones and polyphenoxy ethers.

It is an object of this invention to provide a novel process for the oxidation of 2,6-dialkyl substituted phenols to a variety of quinones and polymers of the phenoxy ether variety.

It is also an object of this invention to provide a method for the direct oxidation of 2,6-dialkylphenols to the corresponding tetra-substituted diphenoquinones.

Other objects of this invention will become evident to those skilled in the art in the following detailed description of the invention.

In general, this process entails the oxidation of an alkylphenol by an oxygen containing gas in the presence of a particular metal chelate and a particular solvent. The reaction is liquid phase and solvent specific since only compounds selected from the group consisting of aliphatic monohydric alcohols containing from 2 to 10 carbon atoms, saturated aliphatic ketones containing from 4 to 12 carbon atoms, esters of a saturated aliphatic monohydric alcohol containing from 4 to 10 carbon atoms and acetic acid, propionic acid, or butyric acid, ethylene glycol diacetate, diethylene glycol diacetate, triethylene glycol diacetate, and ether-esters characterized by the formula

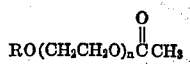

wherein $n$ is 1, 2, or 3 and R is an alkyl group containing from 1 to 4 carbon atoms, are effective as solvent. Illustrative examples of solvents include tertiary amyl alcohol, isopropyl alcohol, secondary butyl alcohol, ethyl alcohol, n-propyl alcohol, n-butyl alcohol, n-amyl alcohol, hexyl alcohol, heptyl alcohol, octyl alcohol, nonyl alcohol, decyl alcohol, methyl isobutyl ketone, methyl ethyl ketone, methyl propyl ketone, diethyl ketone, dipropyl ketone, propyl butyl ketone, dibutyl ketone, butyl amyl ketone, diamyl ketone, amyl hexyl ketone, propyl octyl ketone, butyl acetate, amyl acetate, hexyl acetate, heptyl acetate, octyl acetate, nonyl acetate, decyl acetate, butyl propionate, amyl propionate, hexyl propionate, heptyl propionate, octyl propionate, nonyl propionate, decyl propionate, butyl butyrate, amyl butyrate, hexyl butyrate, heptyl butyrate, octyl butyrate, nonyl butyrate, decyl butyrate, ethylene glycol monoethyl ether acetate, ethylene glycol monomethyl ether acetate, ethylene glycol monopropyl ether acetate, ethylene glycol monobutyl ether acetate, diethylene glycol monobutyl ether acetate, diethylene glycol monopropyl ether acetate, diethylene glycol monomethyl ether acetate, diethylene glycol monoethyl ether acetate, triethylene glycol monoethyl ether acetate, triethylene glycol monomethyl ether acetate, triethylene glycol monopropyl ether acetate, and triethylene glycol monobutyl ether acetate. Preferred solvents include methyl isobutyl ketone amyl acetate, methyl n-amyl ketone, ethylene glycol, diacetate, ethylene glycol monoethyl ether acetate, t-amyl alcohol, and isopropyl alcohol. The catalysts which have been found to be most effective are chelates of cerous and mangnaous ions and in particular those most effective are the acetylacetonate and the salicylideneimine chelates of these two metal ions.

The process comprises heating the catalysts in the solvent system, with all or a portion of the reactant, to reaction temperature in an oxygen atmosphere, and upon reaching reaction temperature injecting the remaining alkylphenol, if any, into the system. These catalysts when mixed in the solvent do not totally dissolve but rather an equilibrium between dissolved catalysts and catalysts in suspension is formed. In general the temperature range at which this process is carried out is from about 30 to about 100° C. and the catalyst concentration is a fraction of a mol per mol of reactant. A preferred temperature range for optimizing the yield would be from about 40° C. to about 80° C., with the catalyst concentration from about 0.2 to 0.0025 mol per mol of reactant. After the reaction has gone to completion the products of the reaction; namely, a diphenoquinone derived from an alkylphenol and/or a polyphenoxy ether of the alkylphenol are separated by the following procedure: the polyphenoxy ether which is soluble in the solvent is separated from any diphenoquinone and the catalyst by filtration and then a washing of the filter cake with an alcohol such as methanol. Most of the catalyst and the diphenoquinone are then separated by dissolving the diphenoquinone in a solvent such as methylene chloride. The dissolved polyphenoxy ether can then be separated from the solvent by evaporation of the solvent leaving behind a solid polyphenoxy ether. The diphenoquinone can then be separated from its solvent by similar treatment.

The monoalkyl and dialkylphenols used in carrying out this oxidation reaction can be any alkylphenol. The alkyl groups where the phenol is dialkyl should be in the 2,6-position but need not be symmetrical groups. Examples of the phenols used in carrying out this process are compounds such as 2,6-xylenol, 2-methyl-6-butylphenol, 2,6-ditertiarybutylphenol, 2,6-disecondarybutylphenol, 2,6-diisopropylphenol, 2,6-diisobutylphenol, 2-octyl-6-methylphenol, 2-isobutyl-6 - dodecylphenol, 2-ethyl-6-methylphenol, 2,6-didecylphenol, para-isopropylphenol, ortho-methylphenol, meta-propylphenol, and para-methylphenol. Where an alkylphenol has been substituted with a non-alkyl moiety it has been found that the reaction will not readily proceed, thus phenols such as 2-methyl-6-chlorophenol or 2-methyl-6-aminophenol are not satisfactory reactants for the oxidation reaction of the instant specification. In a preferred group of alkyl and dialkyl phenols the alkyl group contains at most five carbon atoms.

In a preferred embodiment of this invenition the catalyst is limited to the following chelates: manganous acetylacetonate and manganous salicylideneimine and the solvent is tertiary amyl alcohol, methyl isobutyl ketone, ethylene glycol diacetate, amyl acetate, methyl n-amyl acetate, and ethylene glycol monoethyl ether acetate or isopropyl alcohol. The reaction is carried out at a temperature of from 40 to 80° C.

The products of this reaction are dependent upon the particular phenol used in the reaction, the particular catalyst employed and also the solvent employed. In other words the solvent-catalyst are specific systems causing the reaction to proceed to a particular product mix. Thus, during the oxidation of ortho-methylphenol to a polyphenoxy ether using manganous acetylacetonate in tertiary amyl alcohol, a 71.4% conversion to the polyphenoxy ether is obtained. However, when methyl isobutyl ketone is used instead of the tertiary amyl alcohol above with the same catalyst the polyphenoxy ether is formed at 79% conversion at 100% yield. Furthermore, the solvent-catalyst system does not catalyze oxidation of all phenols in the same manner, thus para-isopropylphenol does not yield a high molecular weight polyphenoxyether rather a dimer or trimer of the phenol is the reaction product. Examples of the products of this reaction include compounds such as 3,5,3′,5′-tetraethyldiphenoquinone, 3-methyl-5-ethyl-3′-methyl-5′-ethyldiphenoquinone; poly(2-methylphenoxy) ether, poly(3-isopropylphenoxy) ether; 3-propyl-5-butyl, 3′-propyl-5′-butyldiphenoquinone and poly(2,6-dimethylphenoxy) ether. In the polyphenoxyether products the number of repeating units in general will be from 2 to about 30 depending upon the particular phenol monomer used. In a preferred mode of reaction the phenols will be limited to 2,6-substituted dialkylphenols wherein the alkyl group contains no more than about 5 carbon atoms.

The compounds made by this process have many uses, for instance, the diphenoquinones which are prepared by the above process upon hydrogenation form valuable bisphenols which can be readily used to make polyester compounds. The polyphenoxyethers prepared by the above process can be used as monomers in preparing polyester products or have been further condensed with alkylphenols to give high molecular weight polymer resins containing polyether linkages, both resins being useful in castings and other applications where thermosetting resins have found preference in the industry.

To illustrate the results of this reaction various runs were made using different alkyl and dialkyl phenols in the solvents useful for this process and with the various catalysts found to be active for this oxidation. These runs are listed in Table I. The process procedures used in these examples are as follows:

(A) A specific amount of solvent, the particular catalyst and the phenol are placed in a sealable reaction vessel which can be stirred by a magnetic stirrer or other means. The reaction vessel is then purged with an oxygen stream until the atmosphere within the vessel is essentially oxygen. Heat is then applied until the reaction system is at the desired reaction temperature. The reaction starts as soon as temperature is reached and proceeds to completion. (Completion is indicated by no further oxygen consumption.)

(B) A solvent, catalyst and about 40 weight percent of the phenol to be reacted are placed in a reaction vessel according to procedure (A) and the vessel is oxygen flushed. The reaction system is then heated to temperature. The remaining phenol is added in increments of about 20 weight percent of the total phenol charge at about ½ hour, about ¾ hour and about 1¼ hours after the reaction temperature is reached. The reaction is then allowed to proceed to completion.

(C) This procedure is identical to procedure (B) except the time intervals for addition of the remaining phenol are approximately ½ hour, ⅚ hour and 1⅙ hours after reaction temperature is reached.

TABLE I.—EXAMPLES 1-17

| Example/ process | Solvent | | Catalyst | | Reactant | | Percent unreacted | Reaction | | O₂, used Mmols | Percent conversion to— | |
|---|---|---|---|---|---|---|---|---|---|---|---|---|
| | Type | ML | Type [2] | Mmols | Type | Mmols | | Temp., °C. | Time/ hours | | Diphenoquinone | Ether, approximate |
| 2/A | TAA | 10 | Mn(AA)₂ | 2.0 | 2,6-xylenol | 15 | 13.5 | 65 | 3.5 | 6.55 | 65 | 11.0 |
| 3/A | IPA | 10 | Mn(AA)₂ | 2.0 | do | 15 | | 50 | 5.0 | 7.73 | 39.6 | 59.0 |
| 4/A | IPA | 10 | Mn(AA)₂ | 2.0 | do | 12 | | 55 | 5.5 | 7.72 | 76.3 | 23.0 |
| 5/A | SBA | 10 | Mn(AA)₂ | 2.0 | do | 15 | 14 | 65 | 1⅙ | 5.8 | 61 | 23.0 |
| 6/A | MIBK | 10 | Mn(AA)₂ | 2.0 | do | 12 | 29.4 | 55 | 5¼ | 4.55 | 59 | 11.0 |
| /A | MIBK | 10 | Mn(AA)₂ | 1.0 | do | 15 | 15.4 | 65 | 5 | 6.6 | 78 | Trace |
| 7/A | MIBK | 10 | Mn(AA)₂ | 0.5 | do | 15 | 23.5 | 65 | 5 | 5.67 | 69.5 | Trace |
| 8/B | TAA | 100 | Mn(AA)₂ | 10.0 | do | 150 | | 65 | 5½ | 81.0 | 81.0 | 18.9 |
| 9/C | MIBK | 100 | Mn(AA)₂ | 10.0 | do | 150 | 19 | 65 | 6 | 67.5 | 76 | 4.0 |
| 10/A | TAA | 10 | Pd(AA)₂ | 2.0 | do | 15 | 100 | 65 | 4 | | | |
| 11/C | MIBK | 100 | Mn(AA)₂ | 5.0 | do | 150 | 23.4 | 65 | 6½ | 86.1 | 72 | Trace |
| 12/A | TAA | 10 | Mn(Salim) | 2.0 | do | 15 | | 65 | 3½ | 7.27 | 39 | 61 |
| 13/A | TAA | 10 | Ce(AA)₃ | 2.0 | do | 15 | 35.5 | 65 | 3 | 4.57 | 39 | 25 |
| 14/A | TAA | 10 | Ce(AA)₃ | 2.0 | do | 15 | 33.6 | 75 | 5 | 5.0 | 42 | 24 |
| 15/A | TAA | 10 | Ce(AA)₃ | 2.0 | o-Cresol | 15 | 68.3 | 75 | 5¼ | 2.28 | | 32 |
| 16/A | TAA | 10 | Mn(AA)₂ | 2.0 | do | 15 | 28.6 | 65 | 5.0 | 6.34 | | 71.4 |
| 17/A | TAA | 10 | Mn(AA)₂ | 2.0 | Para-isopropylphenol | 15 | 65.5 | 70 | 6.0 | 4.06 | | 30.0 |

[1] TAA(tertiary amyl alcohol), IPA(isopropyl alcohol), SBA(secondary butyl alcohol), MIBK(methyl isobutyl ketone).
[2] Mn(AA)₂=Manganous acetylacetonate, Mn(salim)=manganous salicylidene imine, Ce(AA)₃=cerium acetylacetonate, Pd(AA)₂=palladium acetylacetonate.

In the above table, showing the results and the charges of reactants for each example, not only is the product as percent conversion given but also where applicable the percent of the unreacted xylenol or other phenol is tabulated. Also included is a run, listed as Example 10, showing that chelates of ions other than manganous and cerous are not effective in this reaction, thus Example 10 is outside the scope of the subject ingention.

The following procedure is used in Examples 18 through 24: 1.83 grams of 2,6-xylenol, 0.496 gram of manganous acetyl-acetonate, and 10 ml. of the indicated solvent are added to a reactor tube. The reactor is a 25 ml. test tube with a 29/42 standard taper joint at the top. The reactor is heated by an Instatherm coating. Temperature is controlled by a thermistor in a well in the top of the reactor, which also contains a gas inlet tube. Oxygen is introduced from a buret which automatically maintains pressure as 3 to 5 mm. above atmospheric pressure. The reactor is flushed with oxygen at room temperature. The heat is turned on, and pressure is released as temperature rises. The temperature is maintained at 65° C. The reactor is placed on a Vibramixer which produces a fast, swirling action causing a thin film of liquid to more rapidly cover the reactor surface and thereby give good oxygen-liquid contact. After one hour reaction, the reactor is flushed with nitrogen and cooled to room temperature. The contents of the reactor are filtered, and the red tetramethyldiphenoquinone residue is washed with methanol and dried at 60° C. The results obtained are shown in Table II.

TABLE II

| Example number | Solvent | Percent conversion | Percent yield of diphenoquinon |
|---|---|---|---|
| 18 | Ethyl butyl ketone | 44 | 85 |
| 19 | Diisobuty ketone | 24 | 91 |
| 20 | Isobutyl hepty ketone | 32 | 100 |
| 21 | Methy n-amy ketone | 62 | 73 |
| 22 | Ethylene glyco diacetate | 45 | 90 |
| 23 | n-Amy acetate | 30 | 86 |
| 24 [1] | Ethylen glycol ethyl ether acetate | 3 | 98 |

[1] Reaction time is ten minutes.

Having thus described my invention, I claim:

1. A process for the oxidation of alkyl phenols which comprises heating, to a reaction temperature from 30° C. to about 100° C., a slurry comprising unsubstituted alkyl phenol selected from the group consisting of monoalkyl phenols and 2,6-dialkyl phenols, a solvent for the alkyl phenol selected from the group consisting of saturated aliphatic monohydric alcohols containing from 2 to 10 carbon atoms, saturated aliphatic ketones containing from 4 to 12 carbon atoms, esters of a saturated aliphatic monohydric alcohol containing from 4 to 10 carbon atoms and acetic acid, propionic acid, or butyric acid, ethylene glycol diacetate, diethylene glycol diacetate, triethylene glycol diacetate, and ether-esters characterized by the formula

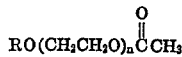

$$RO(CH_2CH_2O)_n\overset{O}{\overset{\|}{C}}CH_3$$

wherein $n$ is 1, 2, or 3 and R is an alkyl group containing from 1 to 4 carbon atoms, and a catalyst selected from the group consisting of manganous acetylacetonate, cerous acetylacetonate, manganous salicylideneimine, and cerous salicylideneimine, while simultaneously contacting said slurry with an oxygen containing gas so as to intimately contact the oxygen, the catalyst, and the alkyl phenol.

2. A process of claim 1 wherein the alkyl group of said alkyl phenol contains from 1 to 5 carbon atoms.

3. A process according to claim 1 wherein the catalyst is manganous acetylacetonate.

4. A process according to claim 1 wherein the catalyst is cerous acetylacetonate.

5. A process according to claim 1 wherein the solvent is selected from the group consisting of methyl isobutyl ketone, amyl acetate, methyl n-amyl ketone, ethylene glycol diacetate, ethylene glycol monoethyl ether acetate, tertiary amyl alcohol, and isopropyl alcohol, the temperature of reaction is from 35° C. to 100° C., and the amount of catalyst employed is from 0.2 to 0.0025 mol per mol of reactant.

6. A process according to claim 5 wherein the catalyst is manganous acetylacetonate.

7. A process according to claim 6 wherein the alkyl phenol is a 2,6-dialkyl substituted phenol wherein the alkyl side chains contain from 1 to 5 carbon atoms.

8. A process according to claim 1 wherein only a portion of the alkyl or dialkyl phenol is added to the slurry initially and the remainder is added incrementally over the course of the reaction.

9. A process according to claim 8 wherein the initial portion of said alkyl or dialkyl phenol is up to about 40 weight percent of the total phenol to be reacted.

10. A process according to claim 9 wherein said catalyst concentration is from 0.2 to about 0.0025 mol per mol of reactant.

11. A process of claim 1 wherein the solvent is selected from the group consisting of saturated aliphatic monoalcohols containing from 2 to 10 carbon atoms and methyl isobutyl ketone.

12. A process of claim 11 wherein the alkyl group of said alkyl phenol contains from 1 to 5 carbon atoms.

13. A process of claim 12 wherein the solvent is selected from the group consisting of isopropyl alcohol, secondary butyl alcohol, tertiary amyl alcohol, and methyl isobutyl ketone, the temperature of reaction is from 35° C. to 100° C., and the catalyst concentration is from 0.2 to 0.0025 mol per mol of reactant.

14. A process of claim 11 wherein the catalyst is manganous acetylacetonate or cerous acetylacetonate.

References Cited

UNITED STATES PATENTS 3,337,501  8/1967  Bussink et al. _____ 260—47

FOREIGN PATENTS 1,166,340  10/1969  Great Britain _____ 260—47
1,193,004  5/1970  Great Britain _____ 260—47

OTHER REFERENCES

Die Mahromolekulare Chemie, 105 (1967), pp. 277–79.

J.A.C.S., 90:25, Dec. 4, 1968, pp. 7134–35.

VIVIAN GARNER, Primary Examiner

U.S. Cl. X.R.

260—47 ET, 613 R

UNITED STATES PATENT OFFICE
CERTIFICATE OF CORRECTION

PATENT NO. : 3,784,575
DATED : January 8, 1974
INVENTOR(S) : Thomas F. Rutledge

It is certified that error appears in the above-identified patent and that said Letters Patent are hereby corrected as shown below:

Column 4, line 55, "ingention" should read -- invention --;
Column 4, line 61, "byan" should read -- by an --;
Column 5, TABLE II, under the heading "Solvent"
"Diisobuty ketone
 Isobutyl hepty ketone
 Methy n-amy ketone
 Ethylene glyco diacetate
 n-Amy acetate
 Ethylen glycol ethyl ether acetate" should read
-- Diisobutyl ketone
 Isobutyl heptyl ketone
 Methyl n-amyl ketone
 Ethylene glycol diacetate
 n-Amyl acetate
 Ethylene glycol ethyl ether acetate --;
Column 5, TABLE II, under the heading "Percent conversion"
last number cited "3" should read -- 36 --.

Signed and sealed this 20th day of May 1975.

(SEAL)
Attest:

RUTH C. MASON
Attesting Officer

C. MARSHALL DANN
Commissioner of Patents
and Trademarks